(12) United States Patent
Liu et al.

(10) Patent No.: US 12,280,673 B2
(45) Date of Patent: Apr. 22, 2025

(54) METHOD FOR CONTROLLING VEHICLE MOUNTED GAME, COMPUTATIONAL PROCESSING DEVICE, AND NON-TRANSITORY COMPUTER READABLE STORAGE MEDIUM

(71) Applicant: Great Wall Motor Company Limited, Hebei (CN)

(72) Inventors: Xiu Liu, Hebei (CN); Yang Liu, Hebei (CN)

(73) Assignee: Great Wall Motor Company Limited, Hebei (CN)

( * ) Notice: Subject to any disclaimer, the term of this patent is extended or adjusted under 35 U.S.C. 154(b) by 207 days.

(21) Appl. No.: 18/001,557

(22) PCT Filed: Jun. 11, 2021

(86) PCT No.: PCT/CN2021/099849
§ 371 (c)(1),
(2) Date: Dec. 12, 2022

(87) PCT Pub. No.: WO2021/249557
PCT Pub. Date: Dec. 16, 2021

(65) Prior Publication Data
US 2023/0241976 A1 Aug. 3, 2023

(30) Foreign Application Priority Data
Jun. 12, 2020 (CN) .......................... 202010540210.5

(51) Int. Cl.
*B60L 1/00* (2006.01)
*B60K 35/00* (2024.01)
(Continued)

(52) U.S. Cl.
CPC ................ *B60L 1/00* (2013.01); *B60K 35/00* (2013.01); *B60L 15/00* (2013.01); *B60L 58/12* (2019.02);
(Continued)

(58) Field of Classification Search
CPC .. B60L 1/00; B60L 15/00; B60L 58/12; B60L 2250/16; B60L 2250/26;
(Continued)

(56) References Cited

U.S. PATENT DOCUMENTS

2015/0087428 A1 3/2015 Dani et al.

FOREIGN PATENT DOCUMENTS

| CN | 1704987 A | 12/2005 |
| CN | 103801075 A | 5/2014 |

(Continued)

OTHER PUBLICATIONS

International Search Report for corresponding Application No. PCT/CN2021/099849 issued Sep. 10, 2021, with English translation.

(Continued)

*Primary Examiner* — Brian P Sweeney
(74) *Attorney, Agent, or Firm* — Renner, Otto, Boisselle & Sklar, LLP (57) ABSTRACT

A method and an apparatus for controlling a vehicle mounted game, a computer program, a storage medium, and a vehicle are provided in the present disclosure. The method is applied to the VCU. The VCU controls a vehicle to be powered at a low voltage in case that it is determined that the vehicle enters a game activation state; when the vehicle is powered at the low voltage, the VUC collects an operation signal of the vehicle, in which, the operation signal includes: an accelerator pedal position signal, a brake pedal position signal, a steering wheel angle signal, and a gear position
(Continued)

controlling a vehicle to be powered at a low voltage in case that it is determined that the vehicle enters a game activation state; — 101 collecting an operation signal of the vehicle when the vehicle is powered at the low voltage; — 102 sending the operation signal to an HUT. — 103 signal of the vehicle; and the VUC sends the operation signal to a vehicle HUT to enable the vehicle HUT to control the vehicle mounted game according to the operation signal.

17 Claims, 6 Drawing Sheets

(51) Int. Cl.
*B60L 15/00* (2006.01)
*B60L 58/12* (2019.01)

(52) U.S. Cl.
CPC ....... *B60L 2250/16* (2013.01); *B60L 2250/26* (2013.01)

(58) Field of Classification Search
CPC ...... B60L 2240/12; B60L 58/14; B60L 58/20; B60L 2250/24; B60K 35/00; B60R 16/02
See application file for complete search history.

(56) References Cited

FOREIGN PATENT DOCUMENTS

| | | | | |
|---|---|---|---|---|
| CN | 104616559 | A | 5/2015 | |
| CN | 204946402 | U | 1/2016 | |
| CN | 206688206 | A | 12/2017 | |
| CN | 109159668 | A * | 1/2019 | |
| CN | 109496188 | A | 3/2019 | |
| CN | 109847337 | A | 6/2019 | |
| CN | 110368679 | A | 10/2019 | |
| CN | 110368680 | A | 10/2019 | |
| CN | 110368681 | A | 10/2019 | |
| CN | 110368681 | B * | 10/2019 | ........... A63F 13/245 |
| CN | 110368682 | A | 10/2019 | |
| CN | 110559656 | A | 12/2019 | |
| CN | 112744082 | A | 5/2021 | |
| JP | 2005087580 | A | 4/2005 | |

OTHER PUBLICATIONS

Written Opinion for corresponding Application No. PCT/CN2021/099849 issued Sep. 10, 2021, no translation available.

\* cited by examiner

METHOD FOR CONTROLLING VEHICLE MOUNTED GAME, COMPUTATIONAL PROCESSING DEVICE, AND NON-TRANSITORY COMPUTER READABLE STORAGE MEDIUM

CROSS-REFERENCE TO RELATED APPLICATIONS

This disclosure is a U.S. national phase of International Patent Application No. PCT/CN2021/099849 with an international filing date of Jun. 11, 2021, designating the U.S., now pending, and further claims the benefit of Chinese patent application No. 202010540210.5 filed on Jun. 12, 2020, the contents of which are incorporated herein by reference.

TECHNICAL FIELD

The present disclosure relates to the technical field of vehicle mounted game, and more particularly to a method and an apparatus for controlling a vehicle mounted game, a computer program, a storage medium, and a vehicle.

BACKGROUND

With the development of the smart cars, vehicles are not only a transportation tool, but also have a certain degree of entertainment functions. The current vehicle entertainment modes are generally based on a central control display in the vehicle. When playing the vehicle mounted games, users use touch screen buttons, external game equipment, and the like. The form of the game and entertainment is single, and only simple human-computer interaction can be performed, which makes the participating users have a poor sense of substitution and a lack of good game experience.

SUMMARY

Embodiments of the present disclosure aims at solving one of technical problems of related technology at least to some extent.

In view of this, it is a first objective of the present disclosure to provide a method for controlling a vehicle mounted game, in order to tackle the technical problem that the existing vehicle mounted game can only realize simple human-computer interaction, which makes the participating users have a poor sense of substitution and a lack of good game experience.

It is a second objective of the present disclosure to provide an apparatus for controlling a vehicle mounted game.

It is a third objective of the present disclosure to provide a vehicle.

In order to achieve the above objectives, embodiments of a first aspect of the present disclosure provide a method for controlling a vehicle mounted game, which is applied to a vehicle controller (vehicle control unit, VCU) and includes: controlling a vehicle to be powered at a low voltage in case that it is determined that the vehicle enters a game activation state; collecting, when the vehicle is powered at the low voltage, an operation signal of the vehicle, wherein the operation signal includes: an accelerator pedal position signal, a brake pedal position signal, a steering wheel angle signal, and a gear position signal of the vehicle; and sending the operation signal to a vehicle head unit (HUT) to enable the vehicle HUT to control the vehicle mounted game according to the operation signal.

According to an embodiment of the present disclosure, the step of determining that the vehicle enters the game activation state includes: acquiring a first state information of the vehicle; and determining that the vehicle enters the game activation state, in case that the first state information satisfies a preset game activation condition.

According to an embodiment of the present disclosure, after the step of controlling the vehicle to be powered at the low voltage, the method further includes: acquiring a second state information of the vehicle; and controlling the vehicle to stop being powered at the low voltage in case that it is determined that the second state information fails to satisfy the preset game activation condition.

According to an embodiment of the present disclosure, both the first state information and the second state information include: a state of an ON gear of an ignition switch, a state of a game switch, a state of a power system, a remaining power of a power battery, and a travel speed of the vehicle. The preset game activation condition includes: the state of the ON gear of the ignition switch being an on state; the state of the game switch being an on state; the state of the power system of the vehicle being a normal state; the remaining power of the power battery being greater than or equal to the first preset power threshold; and the travel speed of the vehicle being smaller than or equal to a preset speed threshold.

According to an embodiment of the present disclosure, the step of controlling the vehicle to be powered at the low voltage includes: sending a high voltage control command to a battery manage system (BMS); and sending a startup command to a direct current converter, after the BMS supplies power at a high voltage according to the high voltage control command, such that the direct current converter supplies power at a low voltage according to the start command.

According to an embodiment of the present disclosure, after sending the startup command to the direct current converter, the method further includes: receiving a startup completion message sent from the direct current converter; and sending a stop command to a steering wheel angle sensor (SAR), to enable the SAR to stop sending a steering signal to a steer-by-wire controller.

According to an embodiment of the present disclosure, before the step of collecting the operation signal of the vehicle, the method further includes: controlling a motor controller of the vehicle to enter a non-torque operating state.

In the method for controlling the vehicle mounted game according to embodiments of the first aspect of the present application, after the VCU determines that the vehicle enters the game activation state, the VCU may send the operation signal of the vehicle to the HUT, and the HUT may control the vehicle mounted game according to the operation signal. In this way, the HUT may control the vehicle mounted game by means of the accelerator pedal, the brake pedal, the steering wheel, and the gear shifter, which make the user have a stronger sense of substitution and better game experience.

To achieve the above objectives, embodiments of a second aspect of the present disclosure provide an apparatus for controlling a vehicle mounted game, which is applied to a vehicle controller and includes: a first control module, configured for controlling a vehicle to be powered at a low voltage in case that it is determined that the vehicle enters a game activation state; a collection module, configured for collecting, when the vehicle is powered at the low voltage, an operation signal of the vehicle, wherein the operation signal includes: an accelerator pedal position signal, a brake pedal position signal, a steering wheel angle signal, and a gear position signal of the vehicle; and a first sending module, configured for sending the operation signal to a vehicle HUT to enable the vehicle HUT to control the vehicle mounted game according to the operation signal.

According to an embodiment of the present disclosure, the first control module is further configured for: acquiring a first state information of the vehicle; and determining that the vehicle enters the game activation state, in case that the first state information satisfies a preset game activation condition.

In the apparatus for controlling the vehicle mounted game according to embodiments of the second aspect of the present application, after the VCU determines that the vehicle enters the game activation state, the VCU may send the operation signal of the vehicle to the HUT, and the HUT may control the vehicle mounted game according to the operation signal. In this way, the HUT may control the vehicle mounted game by means of the accelerator pedal, the brake pedal, the steering wheel, and the gear shifter, which make the user have a stronger sense of substitution and better game experience.

To achieve the above objectives, embodiments of a third aspect of the present disclosure provide a vehicle, including the apparatus for controlling a vehicle mounted game according to embodiments of the second aspect.

To achieve the above objectives, embodiments of a fourth aspect of the present disclosure provide a computational processing device, including: a memory having computer readable codes stored therein; and one or more processors, which, when executing the computer readable codes, causes the computational processing device to perform the method for controlling a vehicle mounted game according to embodiments of the first aspect of the present disclosure.

To achieve the above objectives, embodiments of a fifth aspect of the present disclosure provide a computer program, including computer readable codes, which, when executed in a computational processing device, cause the computational processing device to perform the method for controlling a vehicle mounted game according to embodiments of the first aspect of the present disclosure.

To achieve the above objectives, embodiments of a sixth aspect of the present disclosure provide a computer-readable storage medium, having a computer program according to embodiments of the fifth aspect of the present disclosure.

Additional aspects and advantages of the present disclosure will be set forth, in part, from the following description, and in part will become apparent from the following description, or may be learned by practice of the disclosure.

BRIEF DESCRIPTION OF THE DRAWINGS

The foregoing and/or additional aspects and advantages of the present disclosure will become apparent and readily understood from the following description of embodiments in conjunction with the accompanying drawings.

DETAILED DESCRIPTION OF THE EMBODIMENTS

Embodiments of the present disclosure are described in detail below, and examples of the embodiments are shown in the accompanying drawings, in which, the same or similar reference signs from beginning to end indicate the same or similar elements or elements having the same or similar functions. The embodiments described below by reference to the accompanying drawings are exemplary and are intended to explain the present disclosure and are not to be construed as limiting the present disclosure.

A method and an apparatus for controlling a vehicle mounted game of embodiments of the present disclosure are described below with reference to the accompanying drawings.

Figure 1:
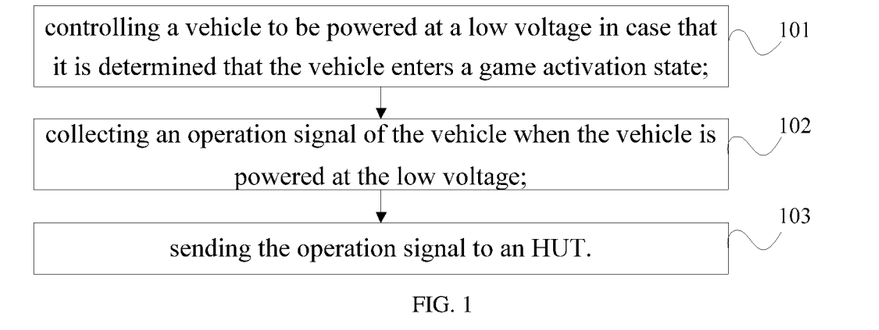
FIG. 1 is a flowchart of a method for controlling a vehicle mounted game according to an embodiment of the present disclosure.

FIG. 1 is a flowchart of a method for controlling a vehicle mounted game according to an embodiment of the present disclosure. The method is applied to a vehicle controller (vehicle control unit, VCU). As shown in FIG. 1, the method for controlling a vehicle mounted game according to an embodiment of the present disclosure includes steps S101-S103.

In step S101, in case that it is determined that a vehicle enters a game activation state, the vehicle is controlled to be powered at a low voltage.

The vehicle may be an electric vehicle or a hybrid vehicle, which is not limited in the present disclosure.

In this step, when the ON gear of the vehicle's ignition switch is in an on state, a central control display of the vehicle can work normally, but a vehicle controller (VCU), a controller area network (CAN) bus of the vehicle, and the like are in a dormant state, in such condition, the vehicle is controlled to be powered at a low voltage, such that the VCU may acquire the operation signal of the vehicle.

In step S102, when the vehicle is powered at the low voltage, an operation signal of the vehicle is collected.

The operation signal includes: an accelerator pedal position signal, a brake pedal position signal, a steering wheel angle signal, and a gear position signal of the vehicle.

In this step, in case that the vehicle is powered at a low voltage, once the user steps on the accelerator pedal, the VCU can obtain the accelerator pedal position signal of the vehicle via the CAN bus; once the user steps on the brake pedal, the VCU can obtain the brake pedal position signal of the vehicle via the CAN bus; once the user turns the steering wheel, the VCU can obtain the steering wheel angle signal of the vehicle via the CAN bus; once the user shifts gears, the VCU can obtain the gear position signal of the vehicle via the CAN bus.

In step S103, the operation signal is sent to an HUT.

In this step, after collecting the operation signal of the vehicle, the VCU may send the operation signal to the HUT, in this way, HUT may control the vehicle mounted game according to the operation signal.

In the above method, when determining that the vehicle enters the game activation state, the VCU controls the vehicle to be powered at a low voltage. In case that the vehicle is powered at the low voltage, an operation signal of the vehicle is collected and sent to the HUT, so that the HUT may control the vehicle mounted game according to the operation signal. That is to say, after the VCU determines that the vehicle enters the game activation state, the VCU may send the operation signal of the vehicle to the HUT, and the HUT may control the vehicle mounted game according to the operation signal. In this way, the HUT may control the vehicle mounted game by means of the accelerator pedal, the brake pedal, the steering wheel, and the gear shifter, which makes the user have a stronger sense of substitution and better game experience.

Figure 2:
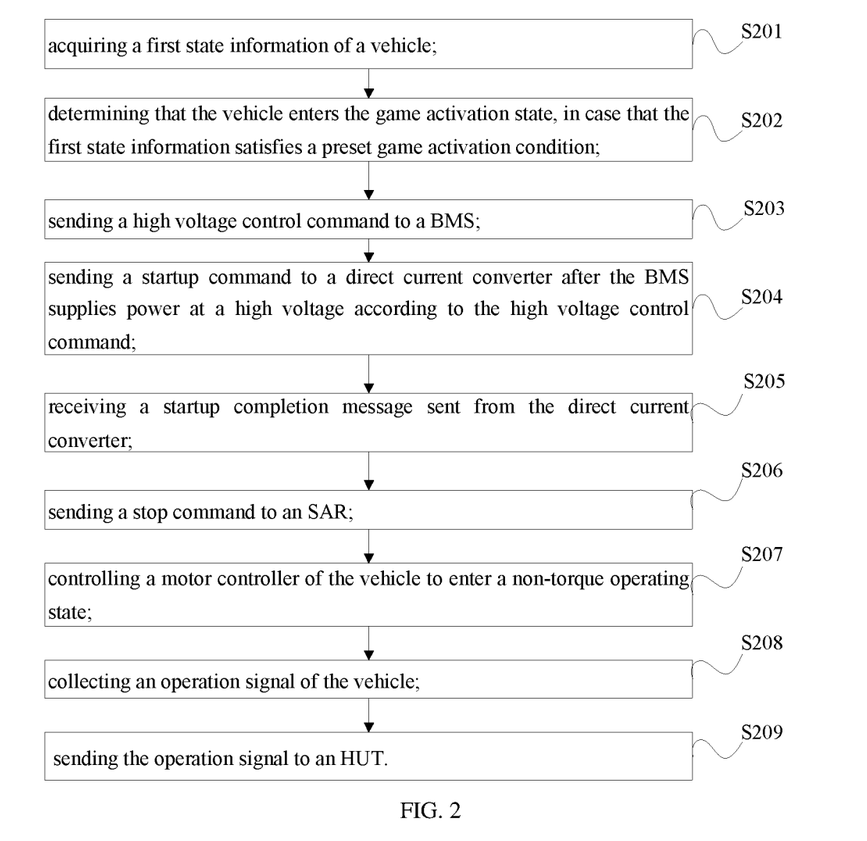
FIG. 2 is a flowchart of another method for controlling a vehicle mounted game according to an embodiment of the present disclosure.

FIG. 2 is a flowchart of another method for controlling a vehicle mounted game according to an embodiment of the present disclosure. As shown in FIG. 2, the method includes steps S201-S209.

In step S201, a first state information of a vehicle is acquired.

The first state information at least includes: a state of an ON gear of an ignition switch, a state of a game switch, a state of a power system, a remaining power of a power battery, and a travel speed of the vehicle.

Figure 3:
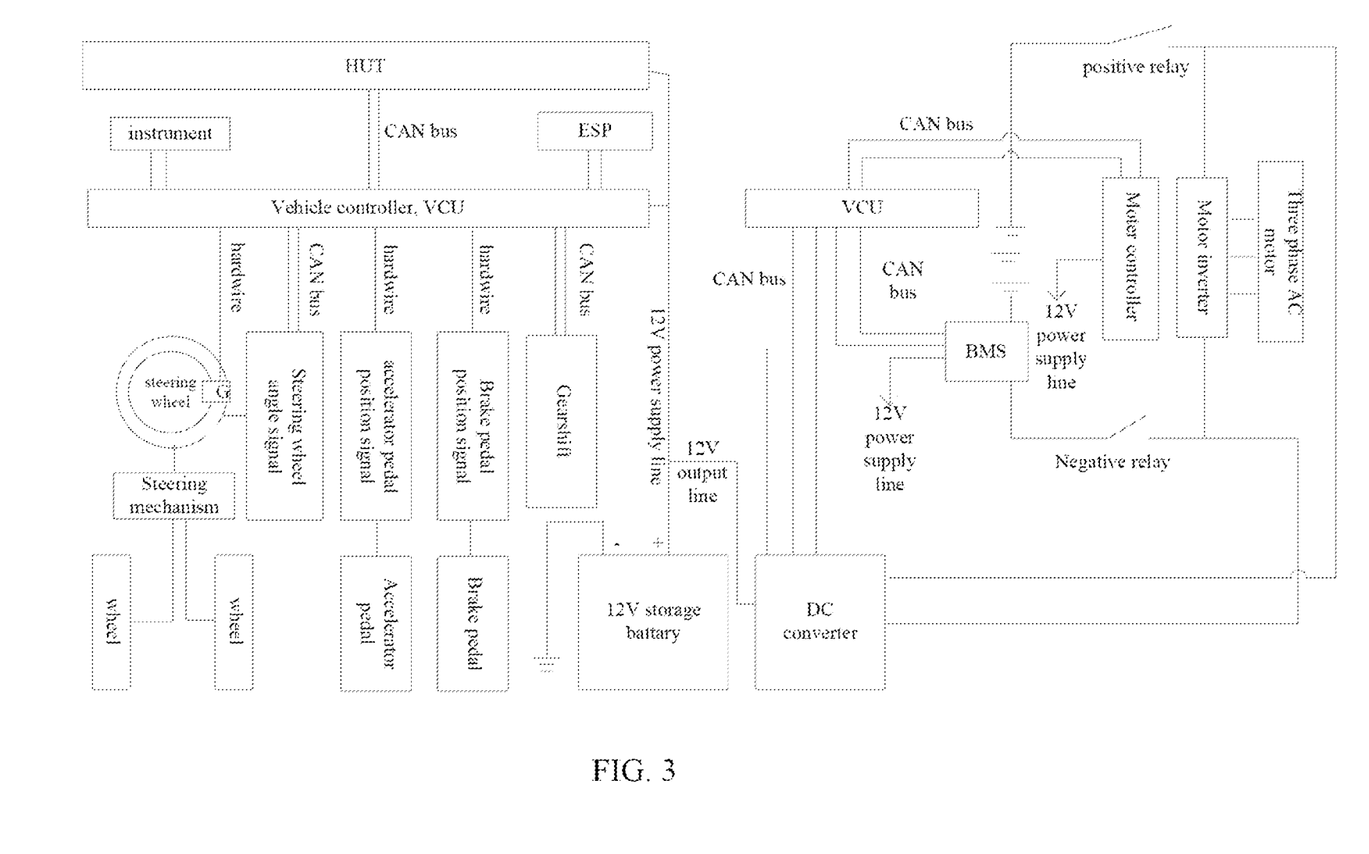
FIG. 3 is a block diagram of a vehicle control system according to an embodiment of the present disclosure.

It should be noted that FIG. 3 is a block diagram of a vehicle control system according to an embodiment of the present disclosure, as shown in FIG. 3, the game switch "G" can be arranged on a steering wheel of the vehicle, so that the user can conveniently turn on the game switch. The game switch is connected to the VCU of the vehicle via a hard wire, therefore, once the user turns on the game switch, the VCU of the vehicle can obtain the trigger operation for the game switch. In addition, the VCU of the vehicle is also connected with the SAR, a gearshift converter, the BMS, a micro control unit (MCU), the direct current converter via the CAN bus, and connected with an accelerator pedal position sensor and a brake pedal position sensor via hard wires.

In this step, when the user turns on the ON gear of the ignition switch, the game switch can be turned on. After acquiring the command for turning on the game switch, the VCU can firstly detect the state of the power system of the vehicle to determine whether the power system of the vehicle can provide a high-voltage power supply, that is, whether the power system can supply power to the vehicle's control system, such that the VCU can acquire the operation signal of the vehicle. Thereafter, when it is determined that the state of the power system of the vehicle is normal, the remaining power of the power battery of the vehicle can be acquired by the VCU to avoid excessive power consumption after starting the vehicle mounted game, which would otherwise result in abnormal traveling of the vehicle. Finally, in order to avoid a dangerous situation caused by unexpected movement of the vehicle when the user is playing the game, the travel speed of the vehicle can be acquired via an electronic stability program (ESP), and the vehicle mounted game can only be started when it is determined that the vehicle is in a stationary state.

In step S202, it is determined that the vehicle enters the game activation state, in case that the first state information satisfies a preset game activation condition.

In this step, after the VCU acquires the first state information of the vehicle, that is, the state of the ON position of the ignition switch, the state of the game switch, the state of the power system, the remaining power of the power battery and the travel speed of the vehicle, it can be determined whether the first state information satisfies the preset game activation condition. The preset game activation condition may be as follows: the state of the ON gear of the ignition switch is an on state; the state of the game switch is an on state; the state of the power system of the vehicle is a normal state; the remaining power of the power battery is greater than or equal to the first preset power threshold; and the travel speed of the vehicle is smaller than or equal to a preset speed threshold.

Here, the first preset power threshold can be determined according to the power threshold that enables the vehicle to travel normally and the power consumption of the vehicle mounted game. For example, if the power threshold that the vehicle can travel normally is 20% of a total power of the power battery, and the power consumption of the vehicle mounted game is relatively high, for example, the power consumption per hour is 10% of the total power of the power battery, then it can be determined that the first preset power threshold is 30%. If the power threshold that enables the vehicle to travel normally is 20% of the total power of the power battery, and the power consumption of the vehicle mounted game is relatively low, for example, the power consumption per hour is 5% of the total power of the power battery, then it can be determined that the first preset power threshold is 25%. Herein, the method for determining the first preset power threshold is not limited in the present disclosure.

In addition, in the preset game activation condition, the travel speed of the vehicle being smaller than or equal to the preset speed threshold is for the purpose of ensuring that the vehicle is in a stationary state in the game activation state, that is, to ensure that the dangerous situation caused by unexpected movement, which cannot be noticed by the user, will not occur, when the user is playing the game. Therefore, the preset speed threshold can be 0. However, in order to avoid errors in the travel speed of the vehicle acquired by ESP, for example, when the vehicle is in a stationary state, the travel speed of the vehicle acquired by ESP is 1 km/h, the preset speed threshold is set to 2 km/h, which is not limited in the present disclosure.

When it is determined that the state of the ON gear of the ignition switch is in the on state, the state of the game switch is in the on state, the state of the power system of the vehicle is in a normal state, the remaining power of the power battery is greater than or equal to the first preset power threshold, and the travel speed of the vehicle is smaller than or equal to the preset speed threshold, it can be determined that the vehicle enters the game activation state.

It should be noted that after the VCU determines that the vehicle has entered the game activation state, the VUC can send the game activation information to the HUT. After receiving the game activation information, the HUT will display the corresponding the vehicle mounted game on the central control display of the vehicle, and the options of confirming and canceling are displayed on the interface of the vehicle mounted game, so that the user can further confirm whether to start the vehicle mounted game.

In step S203, a high voltage control command is sent to a BMS.

In this step, since the energy of the electric vehicle is stored in a high-voltage battery, when the control system of the vehicle needs to operate, the BMS of the vehicle first needs to provide a high-voltage power supply. Herein, the VCU can first detect the state of the BMS, and send the high voltage control command to the BMS when the BMS is in a standby state. After receiving the high voltage control command, the BMS can control the positive relay and the negative relay to close, according to the high voltage control command. In such condition, the state of the BMS is updated to a ready state. As shown in FIG. 3, after the positive relay and the negative relay are closed, the high-voltage circuit is in a conducted state, thereby providing a high-voltage power supply to the vehicle.

In step S204, after the BMS supplies power at a high voltage according to the high voltage control command, a startup command is sent to a direct current converter.

In this step, since the SAR, the gearshift converter, the BMS, the MCU, the direct current converter, the accelerator pedal position sensor, the brake pedal position sensor, and the like all require a 12 V low-voltage power supply, after the BMS provides a high-voltage power supply, the high-voltage power supply is required to be converted into the 12 V low-voltage power supply. After determining that the BMS provides the high-voltage power supply according to the high voltage control command, that is, the BMS is in the ready state, the state of the direct current converter can be acquired. If the state of the direct current converter is a standby state, the VCU may send a startup command to the direct current converter. The direct current converter may provide the low-voltage power supply according to the startup command, and update the direct current converter to a BUCK state.

In step S205, a startup completion message sent from the direct current converter is received.

In this step, after the direct current converter starts the low-voltage power supply, the direct current converter can send the startup completion message to the VCU to notify the VCU that the low-voltage power supply has started.

In step S206, a stop command is sent to an SAR.

In this step, the VCU may send the stop command to the SAR, after receiving the startup completion message sent by the direct current converter, that is, after determining that the low-voltage power supply is normal. When the SAR receives the stop command sent from the VCU, in order to further determine a current state information of the vehicle, the SAR can obtain the state of the game switch, and stop sending the steering signal to the steer-by-wire controller when it is determined that the state of the game switch is the on state. In this way, it is possible to avoid wear on the tires when the user turns the steering wheel in the process of playing the game.

It should be noted that when the user turns on the game switch, a game start command can also be sent to the SAR. In this way, after receiving the stop command sent by the VCU, the SAR does not need to further obtain the state of the game switch, which can improve the efficiency of starting the game.

In step S207, a motor controller of the vehicle is controlled to enter a non-torque operating state.

In this step, the VCU can obtain the state of the motor controller after determining the high-voltage power supply of the vehicle. If it is determined that the motor controller is in the ready state, a control command is sent to the motor controller, and the motor controller can enter the non-torque operating state according to the control command and return the current state of the motor controller to the VCU. In this way, the vehicle can be prevented from moving unexpectedly after starting the game, which would otherwise cause unpredictable dangers.

In step S208, an operation signal of the vehicle is collected.

The operation signal includes: an accelerator pedal position signal, a brake pedal position signal, a steering wheel angle signal, and a gear position signal of the vehicle.

In step S209, the operation signal is sent to an HUT.

In this step, after collecting any of the operation signals, the VCU of the vehicle can send the any of the operation signal to the HUT, and the HUT can control the vehicle mounted game according to the any of the operation signal. For example, after the VUC collects the steering wheel angle signal of the vehicle, the VCU can send the steering wheel angle signal to the HUT, and the HUT can control the steering of the vehicle in the vehicle mounted game according to the steering wheel angle signal. After the VCU collects the accelerator pedal position signal of the vehicle, the VUC can send the accelerator pedal position signal to the HUT, and the HUT can control the acceleration of the vehicle in the vehicle mounted game according to the accelerator pedal position signal, and can also trigger a built-in sound resource of the HUT to emit a booming sound according to the depth of the accelerator pedal. The intensity of the booming sound can be determined according to the depth of the accelerator pedal. The deeper the position of the accelerator pedal is, the louder the booming sound can be. After the VCU collects the brake pedal position signal of the vehicle, the VUC can send the brake pedal position signal to the HUT, and the HUT can control the deceleration of the vehicle in the vehicle mounted game according to the brake pedal position signal, and can also trigger a built-in sound resource of the HUT to emit a brake sound according to the depth of the brake pedal. The intensity of the brake sound can be determined according to the depth of the brake pedal. The deeper the position of the brake pedal is, the louder the brake sound can be. After the VCU collects the gear position signal of the vehicle, the VUC can send the gear position signal to the HUT, and the HUT can control the gearshift of the vehicle in the vehicle mounted game according to the gear position signal. For example, if the gear position signal is a forward gear signal, then the HUT can control the vehicle in the vehicle mounted game to move forward; and if the gear position signal is a reverse gear signal, then the HUT can control the vehicle in the vehicle mounted game to move backward.

It should be noted that, in addition to the above-mentioned kinds of the operation signal, the operation signal may also include a state signal of a vehicle steering light. For example, after the VCU collects the signal that a left steering light of the vehicle is started, the VCU can send such start signal to the HUT, such that the HUT can control the vehicle in the vehicle mounted game to turn on the left steering light according to the start signal. The operation signal may also include the operation signal of other devices in the vehicle, and are not limited in the present disclosure.

In addition, after determining that the vehicle enters the game activation state, the VCU can also periodically acquire the second state information of the vehicle, and control the vehicle to stop the low-voltage power supply when it is determined that the second state information fails to satisfy the preset game activation condition. The second state information at least includes: a state of an ON gear of an ignition switch, a state of a game switch, a state of a power system, a remaining power of a power battery, and a travel speed of the vehicle. If the user sets the ON gear of the ignition switch of the vehicle to be an OFF state, or the user turns off the game switch, or the VCU detects that the state of the power system of the vehicle is abnormal, or that the remaining power of the power battery is smaller than the first preset power threshold, or that the travel speed of the vehicle is greater than the preset speed threshold, then it is determined that the second state information fails to satisfy the preset game activation condition.

The remaining power of the power battery can also be smaller than the second preset power threshold, which is smaller than the first preset power threshold, so that the time for the user to play the game can be prolonged as much as possible, thus improving the user experience.

After the vehicle is powered at the low voltage, the VCU can periodically acquire the second state information, for example, acquire the second state information every 1 minute, and when it is determined that the second state information does not meet the preset game activation condition, the vehicle can be controlled to stop the low-voltage power supply. Herein, the VCU can send a low-voltage exit instruction to the direct current converter, and the direct current converter stops the low-voltage power supply after receiving the low-voltage exit instruction. Afterwards, the VCU can send a high-voltage exit instruction to the BMS, and the BMS, after receiving the high-voltage exit instruction, can control the positive relay and the negative relay to disconnected respectively, whereby stopping the high-voltage power supply. Finally, the VCU can send a state switching command to the motor controller. After receiving the state switching command, the motor controller can enter the torque operating state.

It should be noted that the VCU can also send fault information to the HUT, and the HUT can control the central control display to exit the game mode and display the fault information to remind the user to detect the corresponding fault.

In the above method, when the VCU acquires the first state information of the vehicle, and determines according to the first state information that the vehicle enters the game activation state, the VCU controls the vehicle to be powered at a low voltage. An operation signal of the vehicle is collected and sent to the HUT, so that the HUT may control the vehicle mounted game according to the operation signal. In this way, the HUT may control the vehicle mounted game by means of the accelerator pedal, the brake pedal, the steering wheel, and the gear shifter, which make the user have a stronger sense of substitution and better game experience. In addition, after the vehicle is powered at the low voltage, the SAR of the vehicle can be further controlled to stop sending the steering signal to the steer-by-wire controller, and the motor controller of the vehicle is controlled to enter the non-torque operating state, so as to ensure the safety of the user when the user is playing the game, and to prevent the vehicle from being damaged.

In order to realize the above embodiments, the present disclosure further provides an apparatus for controlling a vehicle mounted game.

Figure 4:
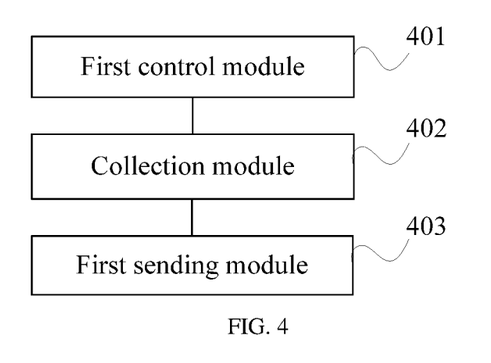
FIG. 4 is a schematic structural diagram of a first apparatus for controlling a vehicle mounted game according to an embodiment of the present disclosure.

FIG. 4 is a schematic structural diagram of an apparatus for controlling a vehicle mounted game according to an embodiment of the present disclosure. The apparatus is applied to the VCU. As shown in FIG. 4, the apparatus includes:

a first control module 401, configured for controlling a vehicle to be powered at a low voltage in case that it is determined that the vehicle enters a game activation state;

a collection module 402, configured for collecting, when the vehicle is powered at the low voltage, an operation signal of the vehicle; in which, the operation signal includes: an accelerator pedal position signal, a brake pedal position signal, a steering wheel angle signal, and a gear position signal of the vehicle; and a first sending module 403, configured for sending the operation signal to a vehicle HUT to enable the vehicle HUT to control the vehicle mounted game according to the operation signal.

Optionally, the first control module 401 is specifically configured for: acquiring a first state information of the vehicle; and determining that the vehicle enters the game activation state, in case that the first state information satisfies a preset game activation condition.

Figure 5:
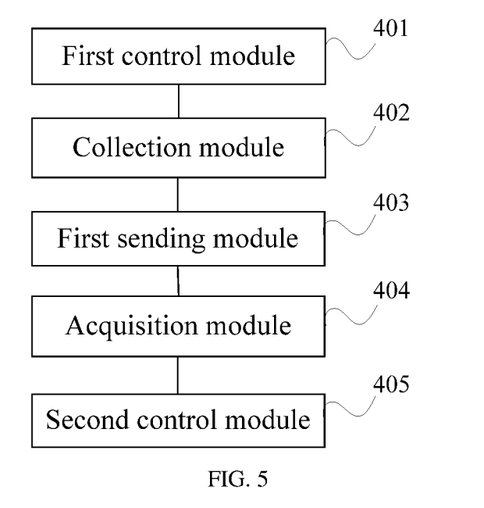
FIG. 5 is a schematic structural diagram of a second apparatus for controlling a vehicle mounted game according to an embodiment of the present disclosure.

FIG. 5 is a schematic structural diagram of a second apparatus for controlling a vehicle mounted game according to an embodiment of the present disclosure. As shown in FIG. 5, the apparatus further includes: an acquisition module 404, configured for acquiring a second state information of the vehicle; and a second control module 405, configured for controlling the vehicle to stop being powered at the low voltage in case that it is determined that the second state information fails to satisfy the preset game activation condition.

Optionally, both the first state information and the second state information include: a state of an ON gear of an ignition switch, a state of a game switch, a state of a power system, a remaining power of a power battery, and a travel speed of the vehicle. The preset game activation condition includes: the state of the ON gear of the ignition switch being an on state; the state of the game switch being an on state; the state of the power system of the vehicle being a normal state; the remaining power of the power battery being greater than or equal to the first preset power threshold; and the travel speed of the vehicle being smaller than or equal to a preset speed threshold.

Optionally, the first control module 401 is specifically configured for: sending a high voltage control command to a BMS; and sending a startup command to a direct current converter, after the BMS supplies power at a high voltage according to the high voltage control command, such that the direct current converter supplies power at a low voltage according to the start command.

Figure 6:
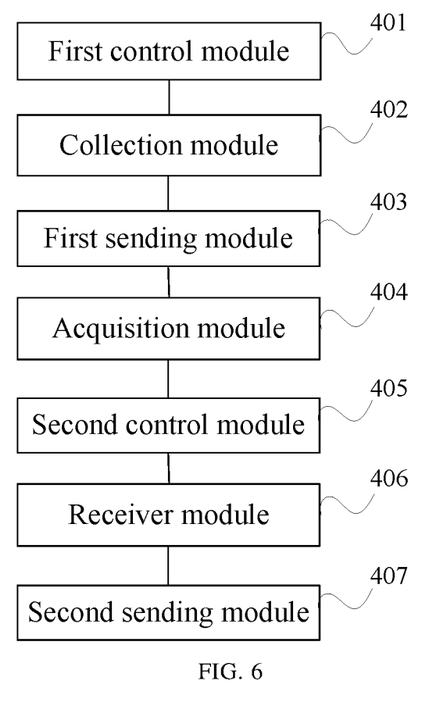
FIG. 6 is a schematic structural diagram of a third apparatus for controlling a vehicle mounted game according to an embodiment of the present disclosure.

Optionally, FIG. 6 is a schematic structural diagram of a third apparatus for controlling a vehicle mounted game according to an embodiment of the present disclosure. As shown in FIG. 6, the apparatus further includes: a receiver module 406, configured for receiving a startup completion message sent from the direct current converter; and a second receiver module 407, configured for sending a stop command to an SAR, to enable the SAR to stop sending a steering signal to a steer-by-wire controller.

Figure 7:
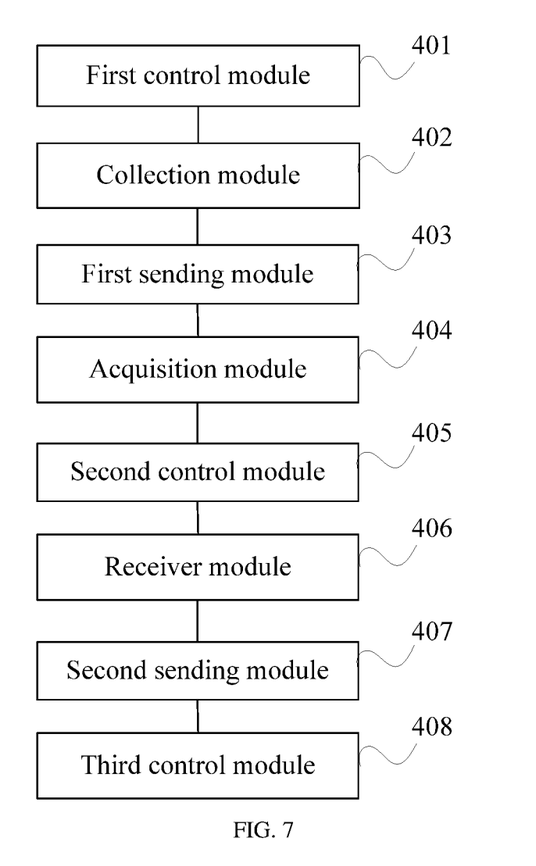
FIG. 7 is a schematic structural diagram of a fourth apparatus for controlling a vehicle mounted game according to an embodiment of the present disclosure.

Optionally, FIG. 7 is a schematic structural diagram of a fourth apparatus for controlling a vehicle mounted game according to an embodiment of the present disclosure. As shown in FIG. 7, the apparatus further includes: a third control module 408, configured for controlling a motor controller of the vehicle to enter a non-torque operating state.

In the above apparatus, when determining that the vehicle enters the game activation state, the VCU controls the vehicle to be powered at a low voltage. In case that the vehicle is powered at the low voltage, an operation signal of the vehicle is collected and sent to the HUT, so that the HUT may control the vehicle mounted game according to the operation signal. That is to say, after the VCU determines that the vehicle enters the game activation state, the VCU may send the operation signal of the vehicle to the HUT, and the HUT may control the vehicle mounted game according to the operation signal. In this way, the HUT may control the vehicle mounted game by means of the accelerator pedal, the brake pedal, the steering wheel, and the gear shifter, which make the user have a stronger sense of substitution and better game experience.

Regarding the apparatus in the foregoing embodiments, the specific manner in which each module executes operations has been described in detail in the embodiments related to the method, and will not be described in detail again herein.

Figure 8:
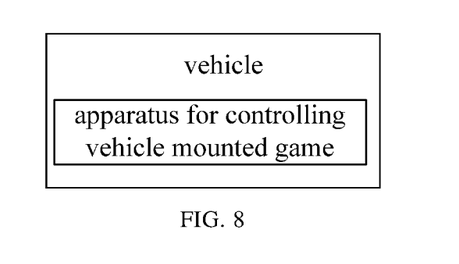
FIG. 8 is a structural block diagram of a vehicle according to an embodiment of the present disclosure.

In order to realize the above-mentioned embodiment, the present disclosure also provides a vehicle 800, as shown in FIG. 8, the vehicle includes the above-mentioned apparatus for controlling the vehicle mounted game.

In order to realize the above embodiments, the present disclosure also provides a computational processing device, which includes:
 a memory having computer readable codes stored therein; and
 one or more processors, which, when executing the computer readable codes, causes the computational processing device to perform the aforementioned method for controlling a vehicle mounted game.

In order to realize the above-mentioned embodiments, the present disclosure also provides a computer program, including computer readable codes, which, when executed in a computational processing device, cause the computational processing device to perform the aforementioned method for controlling a vehicle mounted game.

In order to realize the above-mentioned embodiments, a computer-readable storage medium, having a computer program stored therein.

Figure 9:
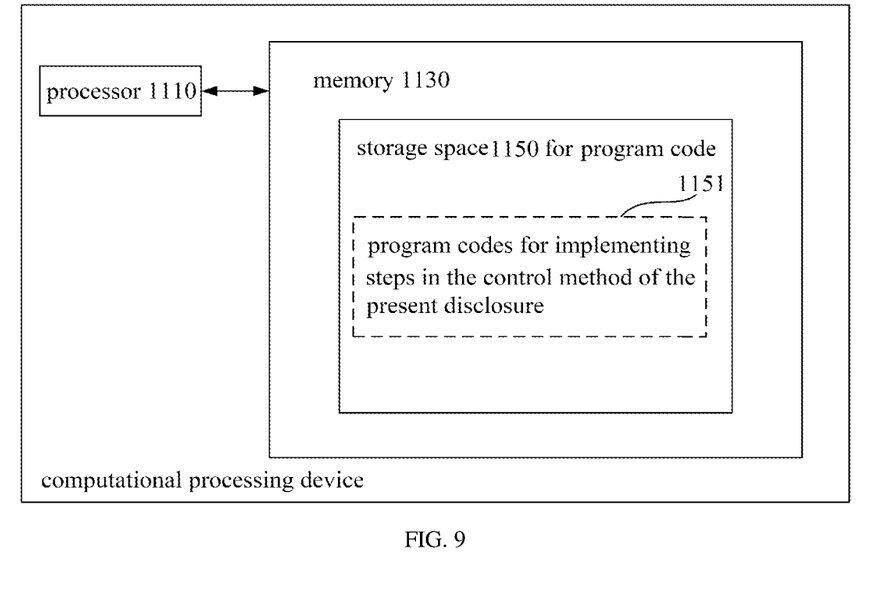
FIG. 9 is a schematic structural diagram of a computational processing device according to an embodiment of the present disclosure.
Figure 10:
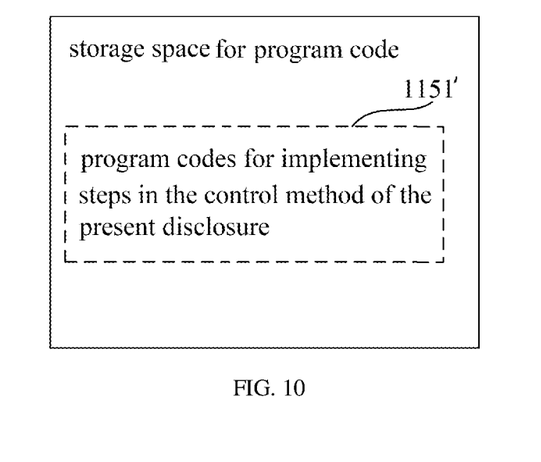
FIG. 10 is a schematic diagram of a portable or fixed storage unit, in which, program codes for implementing the method according to the present disclosure are stored, according to an embodiment of the present disclosure.

FIG. 9 provides a schematic structural diagram of a computational processing device according to an embodiment of the present disclosure. The computational processing device typically includes a processor 1110 and a computer program product or computer readable medium in the form of a memory 1130. The memory 1130 may be an electronic memory, such as a flash memory, an electrically erasable programmable read only memory (EEPROM), EPROM, hard disk, or ROM. The memory 1130 has a storage space 1150 for a program code 1151 for performing any of the method steps in the above-described methods. For example, the storage space 1150 for the program code may include various program codes 1151 for implementing various steps in the above methods, respectively. The program codes can be read from or written to one or more computer program products. These computer program products include program code carriers such as hard disks, compact disks (CDs), memory cards or floppy disks. Such computer program products are typically portable or fixed storage units as shown in FIG. 10. The storage unit may have storage segments, storage spaces, etc. arranged similarly to the memory 1130 in the server of FIG. 11. The program code may, for example, be compressed in a suitable form. Typically, the storage unit includes a computer readable code 1151', that is, a code readable by a processor such as 1110, for example, which, when executed by a computational processing device, causes the computational processing device to perform any of the method steps in the above-described methods.

In the description of the specification, description with reference to the terms "one embodiment", "some embodiments", "example", "specific example", or "some examples", etc., mean specific features, structures, materials, or features described in connection with the embodiment or example are included in at least one embodiment or example of the present disclosure. In this specification, schematic representations of the above terms are not necessarily directed to the same embodiment or example. Furthermore, the particular features, structures, materials, or features described may be combined in any suitable manner in any one or more embodiments or examples. Furthermore, those skilled in the art may combine different embodiments or examples described in this specification, as well as the features of the different embodiments or examples, without conflicting each other.

In addition, the terms "first" and "second" are only used for descriptive purposes, and should not be construed as indicating or implying relative importance or implying the number of indicated technical features. Thus, a feature defined with "first", "second" may expressly or implicitly include at least one of that feature. In the description of the present disclosure, "plurality" means at least two, such as two, three, etc., unless expressly and specifically defined otherwise.

Any process or method description in the flowcharts or otherwise described herein may be understood to represent a module, segment, or portion of code comprising one or more executable instructions for implementing custom logical functions or steps of the process. The scope of the preferred embodiments of the present disclosure includes alternative implementations in which the functions may be performed out of the order shown or discussed, including performing the involved functions substantially concurrently or in the reverse order, depending upon the functions involved, this may be understood by those skilled in the art to which the embodiments of the present disclosure pertain.

The logic and/or steps represented in flowcharts or otherwise described herein, for example, may be considered an ordered listing of executable instructions for implementing the logical functions, and may be embodied in any computer-readable medium, for use with, or in conjunction with, an instruction execution system, apparatus, or device (such as a computer-based system, a system including a processor, or other system that can fetch instructions from and execute instructions from an instruction execution system, apparatus, or device). For the purposes of this specification, a "computer-readable medium" can be any device that can contain, store, communicate, propagate, or transport the program for use by or in conjunction with an instruction execution system, apparatus, or device. More specific examples (non-exhaustive list) of computer readable media include the following: electrical connections with one or more wiring (electronic devices), portable computer disk cartridges (magnetic devices), random access memory (RAM), read only memory (ROM), erasable editable read only memory (EPROM or Flash Memory), fiber optic devices, and portable compact disc read only memory (CDROM). In addition, the computer readable medium may even be paper or other suitable medium on which the program may be printed, as the paper or other medium may be optically scanned, for example, followed by editing, interpretation, or processed by other suitable manner if necessary, so as to obtain the program electronically and then the program is stored in computer memory.

It should be understood that portions of the present disclosure may be implemented in hardware, software, firmware, or a combination thereof. In the above-described embodiments, various steps or methods may be implemented in software or firmware stored in memory and executed by a suitable instruction execution system. For example, if the implementation in hardware is the same as the implementation manner in another embodiment, any one of the following techniques known in the art or any combination thereof can be adopted: discrete logic circuits with logic gates for implementing logic functions on data signals, application-specific integrated circuits with suitable combinational logic gates, programmable gate array (PGA), and field programmable gate arrays (FPGA) etc.

Those skilled in the art can understand that all or part of the steps included in the methods of the above embodiments can be completed by instructing the relevant hardware through a program, and the program can be stored in a computer-readable storage medium. When the program is executed, one or a combination of the steps of the method embodiment is implemented.

In addition, functional units in embodiments of the present disclosure may be integrated into one processing module, or each unit may exist physically alone, or two or more units may be integrated into one module. The above-mentioned integrated modules can be implemented in the form of hardware, and can also be implemented in the form of software function modules. If the integrated modules are implemented in the form of software functional modules and sold or used as independent products, the integrated modules may also be stored in a computer-readable storage medium.

The above-mentioned storage medium may be a read-only memory, a magnetic disk, an optical disk, and the like, although the embodiments of the present disclosure have been shown and described above, it should be understood that the above-mentioned embodiments are exemplary and should not be construed as limiting the present disclosure. Variations, modifications, substitutions, and alterations to the above-described embodiments may be made by those of ordinary skill in the art within the scope of the present disclosure.

What is claimed is:

1. A method for controlling a vehicle mounted game, being applied to a vehicle controller, and comprising:
   controlling a vehicle to be powered at a low voltage in case that it is determined that the vehicle enters a game activation state;
   collecting, when the vehicle is powered at the low voltage, an operation signal of the vehicle, wherein the operation signal comprises: an accelerator pedal position signal, a brake pedal position signal, a steering wheel angle signal, and a gear position signal of the vehicle; and
   sending the operation signal to a vehicle head unit to enable the vehicle head unit to control the vehicle mounted game according to the operation signal:
   wherein
   the step of controlling the vehicle to be powered at the low voltage comprises:
      sending a high voltage control command to a battery manage system; and
      sending a startup command to a direct current converter, after the battery manage system supplies power at a high voltage according to the high voltage control command, such that the direct current converter supplies power at a low voltage according to the start command.

2. The method according to claim 1, wherein the step of determining that the vehicle enters the game activation state comprises:
   acquiring a first state information of the vehicle; and
   determining that the vehicle enters the game activation state, in case that the first state information satisfies a preset game activation condition.

3. The method according to claim 2, after the step of controlling the vehicle to be powered at the low voltage, further comprising:
   acquiring a second state information of the vehicle; and
   controlling the vehicle to stop being powered at the low voltage in case that it is determined that the second state information fails to satisfy the preset game activation condition.

4. The method according to claim 3, wherein
   both the first state information and the second state information comprise: a state of an ON gear of an ignition switch, a state of a game switch, a state of a power system, a remaining power of a power battery, and a travel speed of the vehicle; and
   the preset game activation condition comprises:
      the state of the ON gear of the ignition switch being an on state;
      the state of the game switch being an on state;
      the state of the power system of the vehicle being a normal state;
      the remaining power of the power battery being greater than or equal to the first preset power threshold; and
      the travel speed of the vehicle being smaller than or equal to a preset speed threshold.

5. The method according to claim 1, after sending the startup command to the direct current converter, further comprising:
   receiving a startup completion message sent from the direct current converter; and
   sending a stop command to a steering wheel angle sensor, to enable the steering wheel angle sensor to stop sending a steering signal to a steer-by-wire controller.

6. The method according to claim 1, before the step of collecting the operation signal of the vehicle, further comprising:
   controlling a motor controller of the vehicle to enter a non-torque operating state.

7. A computational processing device, comprising:
   a memory having computer readable codes stored therein; and
   one or more processors, which, when executing the computer readable codes, causes the computational processing device to perform a method for controlling a vehicle mounted game, comprising:
   controlling a vehicle to be powered at a low voltage in case that it is determined that the vehicle enters a game activation state;
   collecting, when the vehicle is powered at the low voltage, an operation signal of the vehicle, wherein the operation signal comprises: an accelerator pedal position signal, a brake pedal position signal, a steering wheel angle signal, and a gear position signal of the vehicle; and
   sending the operation signal to a vehicle head unit to enable the vehicle head unit to control the vehicle mounted game according to the operation signal;

wherein
the step of controlling the vehicle to be powered at the low voltage comprises:
sending a high voltage control command to a battery manage system; and
sending a startup command to a direct current converter, after the battery manage system supplies power at a high voltage according to the high voltage control command, such that the direct current converter supplies power at a low voltage according to the start command.

8. The computational processing device according to claim 7, wherein the step of determining that the vehicle enters the game activation state comprises:
acquiring a first state information of the vehicle; and
determining that the vehicle enters the game activation state, in case that the first state information satisfies a preset game activation condition.

9. The computational processing device according to claim 8, wherein after the step of controlling the vehicle to be powered at the low voltage, the method for controlling the vehicle mounted game further comprises:
acquiring a second state information of the vehicle; and
controlling the vehicle to stop being powered at the low voltage in case that it is determined that the second state information fails to satisfy the preset game activation condition.

10. The computational processing device according to claim 9, wherein
both the first state information and the second state information comprise: a state of an ON gear of an ignition switch, a state of a game switch, a state of a power system, a remaining power of a power battery, and a travel speed of the vehicle; and
the preset game activation condition comprises:
the state of the ON gear of the ignition switch being an on state;
the state of the game switch being an on state;
the state of the power system of the vehicle being a normal state;
the remaining power of the power battery being greater than or equal to the first preset power threshold; and
the travel speed of the vehicle being smaller than or equal to a preset speed threshold.

11. The computational processing device according to claim 7, wherein after sending the startup command to the direct current converter, the method for controlling the vehicle mounted game further comprises:
receiving a startup completion message sent from the direct current converter; and
sending a stop command to a steering wheel angle sensor, to enable the steering wheel angle sensor to stop sending a steering signal to a steer-by-wire controller.

12. The computational processing device according to claim 7, wherein before the step of collecting the operation signal of the vehicle, the method for controlling the vehicle mounted game further comprises:
controlling a motor controller of the vehicle to enter a non-torque operating state.

13. A non-transitory computer-readable storage medium, having a computer program which, when executed by a processor, causes the processor to implement a method for controlling a vehicle mounted game, being applied to a vehicle controller, and comprising:
controlling a vehicle to be powered at a low voltage in case that it is determined that the vehicle enters a game activation state;
collecting, when the vehicle is powered at the low voltage, an operation signal of the vehicle, wherein the operation signal comprises: an accelerator pedal position signal, a brake pedal position signal, a steering wheel angle signal, and a gear position signal of the vehicle; and
sending the operation signal to a vehicle head unit to enable the vehicle head unit to control the vehicle mounted game according to the operation signal;
wherein
the step of controlling the vehicle to be powered at the low voltage comprises:
sending a high voltage control command to a battery manage system; and
sending a startup command to a direct current converter, after the battery manage system supplies power at a high voltage according to the high voltage control command, such that the direct current converter supplies power at a low voltage according to the start command.

14. The non-transitory computer-readable storage medium according to claim 13, wherein the step of determining that the vehicle enters the game activation state comprises:
acquiring a first state information of the vehicle; and
determining that the vehicle enters the game activation state, in case that the first state information satisfies a preset game activation condition.

15. The non-transitory computer-readable storage medium according to claim 14, wherein after the step of controlling the vehicle to be powered at the low voltage, the method for controlling the vehicle mounted game further comprises:
acquiring a second state information of the vehicle; and
controlling the vehicle to stop being powered at the low voltage in case that it is determined that the second state information fails to satisfy the preset game activation condition.

16. The non-transitory computer-readable storage medium according to claim 15, wherein
both the first state information and the second state information comprise: a state of an ON gear of an ignition switch, a state of a game switch, a state of a power system, a remaining power of a power battery, and a travel speed of the vehicle; and
the preset game activation condition comprises:
the state of the ON gear of the ignition switch being an on state;
the state of the game switch being an on state;
the state of the power system of the vehicle being a normal state;
the remaining power of the power battery being greater than or equal to the first preset power threshold; and
the travel speed of the vehicle being smaller than or equal to a preset speed threshold.

17. The non-transitory computer-readable storage medium according to claim 13, wherein after sending the startup command to the direct current converter, the method for control the vehicle mounted game further comprises:
receiving a startup completion message sent from the direct current converter; and
sending a stop command to a steering wheel angle sensor, to enable the steering wheel angle sensor to stop sending a steering signal to a steer-by-wire controller.

* * * * *